United States Patent [19]

Funcik et al.

[11] 4,091,695
[45] May 30, 1978

[54] WIRE PREPARATION MACHINE WITH VARIABLE INSULATION STRIPPING MECHANISM

[75] Inventors: Jack F. Funcik, Downers Grove; Joseph C. Bennett, Lisle, both of Ill.; Vito A. Fusco, deceased, late of Palos Hills, Ill., by Mary Fusco, legal representative, by Janet Fusco, heir, by Michael Fusco, heir

[73] Assignee: Molex Incorporated, Lisle, Ill.

[21] Appl. No.: 772,534

[22] Filed: Feb. 28, 1977

[51] Int. Cl.² ............................................. H02G 1/12
[52] U.S. Cl. .................................. 81/9.51; 29/564.4; 83/924
[58] Field of Search ................ 81/9.51; 83/924; 29/564.4, 33 S

[56] References Cited

U.S. PATENT DOCUMENTS

| | | | |
|---|---|---|---|
| 2,811,063 | 10/1957 | Eubanks | 81/9.51 |
| 3,309,948 | 3/1967 | Falken | 81/9.51 |
| 3,612,111 | 10/1971 | Meyer | 81/9.51 X |
| 3,741,261 | 6/1973 | Windsor et al. | 29/564.4 X |

Primary Examiner—Gil Weidenfeld

[57] ABSTRACT

A wire preparation machine for fabricating a continuous length of insulation clad wire into a plurality of cut and stripped wire leads. The machine includes a preparation station whereat the wire is cut and stripped. Located at the preparation station are a cutting mechanism for cutting the wire and a stripping mechanism spaced a given distance from the cutting mechanism for stripping insulation from the wire lead exposing a given length of conductor from the end of the wire lead. An intermittent wire drive mechanism is provided for moving the wire to the preparation station after each cutting and stripping operation. The stripping mechanism is mounted on a stripper mounting means for movement relative to the cutting mechanism so as to vary the distance therebetween. Control means is provided for programming the distance the stripper mounting means is allowed to move the cutting mechanism after each cutting and stripping operation. The machine will thus produce a plurality of wire leads in a predetermined sequence of exposed conductor lengths.

2 Claims, 5 Drawing Figures

U.S. Patent    May 30, 1978    4,091,695

WIRE PREPARATION MACHINE WITH VARIABLE INSULATION STRIPPING MECHANISM

BACKGROUND OF THE INVENTION

1. Field of the Invention

The present invention relates generally to wire preparation machines and specifically to machines of the type for fabricating a continuous length of insulation clad wire into a plurality of cut and stripped wire leads.

2. Brief Description of the Prior Art

Wire preparation machines for fabricating a continuous length of insulation clad wire into a plurality of cut and stripped wire leads are well known in the art as exemplified in U.S. Pat. No. 3,769,681, issued Nov. 6, 1973, the contents of which are incorporated by reference herein. The above-mentioned patent discloses a machine which has a preparation station whereat the wire is cut and stripped, a cutting mechanism at the preparation station for cutting the insulation clad wire, a stripping mechanism at the preparation station spaced a given distance from the cutting mechanism for stripping insulation from the wire lead exposing a given length of conductor from the end of the wire lead, and intermittent drive means for moving the wire to the preparation station after each cutting and stripping operation.

It may be desirable to use machines of the type described to produce a plurality of wire leads having different characteristics depending on the application of that particular wire lead. More particularly, a machine of this type can be used in association with other means for applying a terminal onto the end of the cut and stripped wire lead as described in U.S. Pat. No. 4,005,889, issued Nov. 1, 1977, assigned to the assignee of the present invention. The above patent, the contents of which are incorporated herein discloses the use of the wire preparation of the type described herein in association with an automatic terminating and lead insertion means.

In such an application, it may be desirable not only to vary the length of the wire lead, but, also to vary the length of the insulation strip, i.e., the length of the exposed conductor after the cutting and stripping mechanism. To date, the prior art has not taught a means of producing a plurality of cut and stripped wire leads where the amount of exposed conductor is varied in a given sequence.

SUMMARY OF THE INVENTION

It is, therefore, the principal object of the present invention to provide a wire preparation machine of the type described above having an improvement for providing a plurality of cut and stripped wire leads, each having a different length of exposed conductor in a given programmed sequence. The improvement comprises a stripper mounting means for mounting the stripping mechanism for movement relative to the cutting mechanism so as to vary the distance therebetween and a control means for programming the distance the stripper mounting means is allowed to move the cutting mechanism after each cutting and stripping operation, whereby said machine will produce a plurality of wire leads in a predetermined sequence of exposed conductor lengths.

DESCRIPTION OF THE PREFERRED EMBODIMENT

Figure 1:
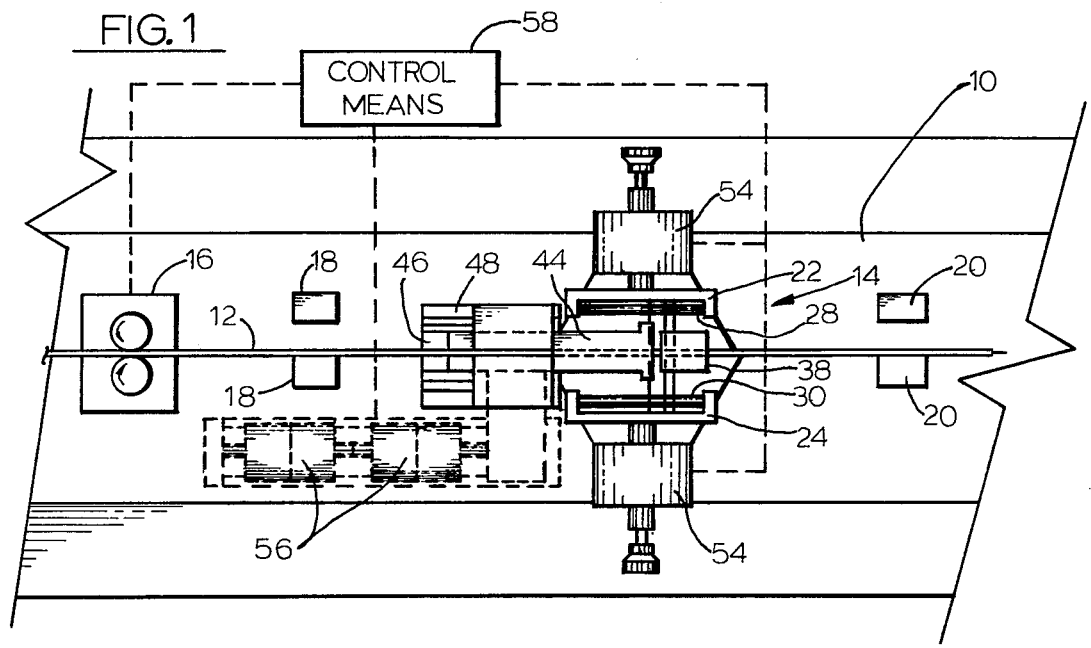
FIG. 1 is a fragmentary side elevational view showing a portion of a wire preparation machine with a preparation station in a first mode.

Turning now to FIG. 1, there as shown a portion of a front wall 10 of a wire preparation machine for fabricating a continuous length of insulation clad wire 12 into a plurality of cut and stripped wire leads 13. The machine is seen to include a preparation station, generally designated 14, whereat the wire 12 is cut to a given length and has a given amount of insulation 15 stripped from either side thereof.

Each wire lead 13 has a first end 13a which enters the preparation station 14 first and is stripped and a second end 13b which is moved to the preparation station 14 and stripped after the first end 13b has been stripped. Initially, the first end 13b appears at the end of the continuous piece of wire 12.

Intermittent drive means, generally designated 16, is provided to move the wire 12 a given distance to the preparation station 14. The amount of time that the drive means 16 engages wire 12, determines the length of wire 12 that will be cut off at at the preparation station 14. After each cutting and stripping operation, the drive means 16 moves another length of wire 12 to the preparation station 14.

A first pair of upper and lower grippers 18 (located to the left of the preparation station as seen in FIG. 1) grasps the continuous wire 12 at a point before entering the preparation station 14. A second pair of upper and lower grippers 20 (as seen to the right of the preparation station in FIG. 1) are provided to grasp the wire 12 at a point after being fed through the preparation station 14. It is to be noted that only the upper gripper of each pair 18 and 20 are movable relative to the lower gripper of each pair between a gripping and non-gripping position. The grippers can be driven by air cylinders (not shown) or other suitable means.

The cutting and stripping mechanism is located at the preparation station 14 and is seen to generally include upper and lower blade carrying support members 22 and 24, each having a horizontal blade mounting rod 28 and 30 mounted therein. Each rod 28 and 30 mounts three blades 32, 34 and 36, which oppose the corresponding blade 32, 34 and 36 on the other rod 28 or 30.

Support members 22 and 24 are movable toward one another to a "cutting" position and away from one another to a "non-cutting" position. When the support members 22 and 24 are moved to their cutting position, the blades 32, 34 and 36 engage the wire 12 to produce the following results:

a. Blades 32 engage the insulation only of the first end 13a of the continuous wire 12 as it first enters the preparation station 14 for the purpose of removing insulation 15 from the first end 13a of the wire 12.
b. Cutting blades 34 cut completely through the wire 12 for the purpose of severing a wire length 13 from the continuous wire 12.
c. Blades 36 which are spaced a given distance from blades 34 cut through only the insulation of the second end 13b of the cut wire length 13 for the purpose of removing a given amount of insulation therefrom.

The second end 13b of the wire length 13 always has the same amount of insulation 15 stripped therefrom inasmuch as it is assumed that it will always be attached to the same type of terminal. Accordingly, the distance between a cutting blades 34 and stripping blades 36 is a constant distance. To this end, there is provided a stationary blade guide member 38 mounted on the machine wall 10 having slots 40 and 42 formed therein to slidingly receive blades 34 and 36, respectively, for up and down movement. Blade guide member 38 has a passageway formed therethrough to receive a wire length 13.

It may be desirable to vary the amount of insulation that is stripped from the first end 13a of the wire 12. Accordingly, the distance between the stripping blades 32 and the cutting blades 34 must be varied. To this end, there is provided a variable stripper mounting means in the form of a variable stripper blade mounting member 44 being slidingly mounted in a recess 46 formed in member 48 secured to the machine wall 10. The blade mounting member 44 has a slot to slidingly receive stripping blades 32 therein and capture blades 32 for up and down movement with the mounting member 44 and a passageway formed therethrough to receive the wire 12. If mounting member 44 moves side to side, stripping blades 32 which are captured in the slots 50 move side to side, sliding along their respective mounting rods 28 and 30.

Air cylinders 54, or other suitable means, are attached to the support members 22 and 24 to move said members upwardly and downwardly between the cutting and non-cutting positions. Another set of air cylinders 56, or other suitable means, are associated with the mounting member 44 to variably move the mounting member and its associated stripping blades 32 a given distance away from cutting blades 34. The use of air cylinders in a similar type of application is disclosed in U.S. Pat. No. 3,964,147, assigned to the assignee of the present invention.

Suitable control means, generally designated 58, are provided in association with the grippers 18 and 20, of the drive means 16, and air cylinders 54 and 56. The earlier mentioned U.S Pat. Nos. 3,769,681 and 4,055,889 disclose such suitable control means. By programming the control means 58, one can produce a plurality of wire leads 13, each successive wire lead having a different length and a different amount of insulation is stripped from one end thereof.

Turning now to FIGS. 1 - 5, the cutting and stripping mechanism is shown in five different modes illustrating the operation thereof. Each of the five modes will be discussed in the following paragraphs.

The first mode, as shown in FIG. 1, is defined by the following conditions:
1. The drive means 16 engages the wire 12 and is moving the wire.
2. The grippers 18 and 20 are open.
3. The blade support members 22 and 24 are in their non-cutting position.

Figure 2:
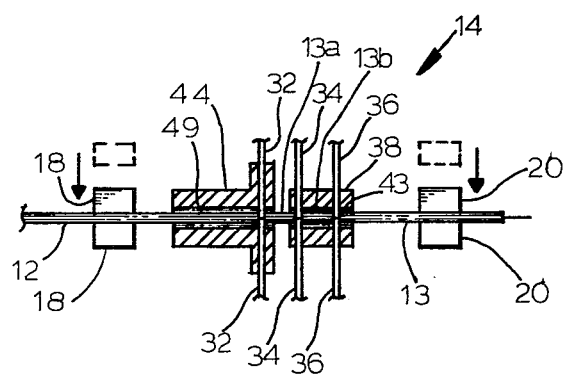
FIG. 2 is a schematic illustration of the preparation station showing the cutting and stripping mechanism in a second mode.

After the wire 12 is moved to the preparation station 14 as shown in FIG. 1, the second mode, as shown in FIG. 2, is defined by the following conditions:
1. The drive means 16 is in a non-engaging position.
2. The grippers 18 and 20 are closed to their gripping position to hold the wire 12.
3. Support members 22 and 24 are brought toward each other to their cutting position resulting in blades 32, 34 and 36 cutting wire 12 in the manner described above.

Figure 3:
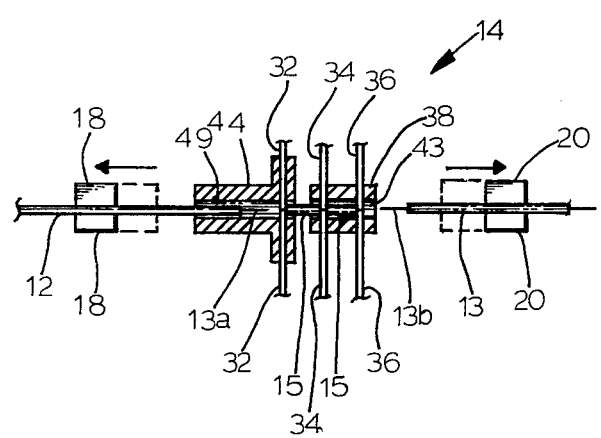
FIG. 3 is a schematic illustration of the preparation station showing the cutting and stripping mechanism in a third mode.

The third mode as shown in FIG. 3, is defined by the following conditions:
1. The drive means 16 remains in its non-engaging position.
2. The grippers 18 and 20 remain in their gripping positions but are moved away from each other.
3. Support members 22 and 24 remain in their cutting position so that the movement of the grippers 18 and 20 cause a wire length 13 to be separated from the continuous piece of wire 12 and, at the same time cause the stripped portions of insulation 15 to be removed from the wire.

Figure 4:
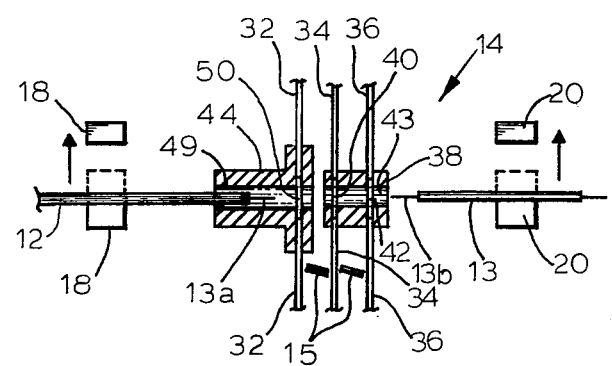
FIG. 4 is a schematic illustration of the preparation station showing the cutting and stripping mechanism in a fourth mode.

The fourth mode, as shown in FIG. 4, is defined by the following conditions:
1. The drive means remains in its non-engaging position.
2. The grippers 18 and 20 are opened to their non-gripping position.
3. The support members 22 and 24 are open to its non-cutting position so that the strips of insulation 15 are ejected from the cutting and stripping mechanism.

Figure 5:
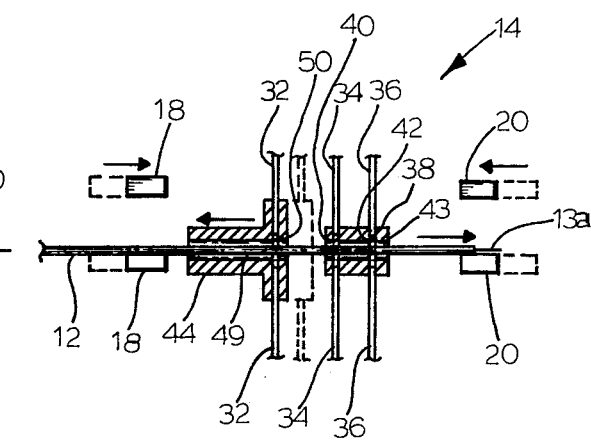
FIG. 5 is a schematic illustration of the preparation station showing the cutting and stripping mechanism in a fifth mode.

The fifth mode as shown in FIG. 5, is identical to the first mode except that the stripper blade mounting member 44 has been moved to provide a different length of insulation strip for the next wire length 13. The amount that member 44 moves is governed by how control means 58 is programmed.

It is understood that the means for varying the length of insulation stripped from a wire can be employed to variably strip both ends of a wire length. This can be effected by mounting another member 44 in place of member 38.

We claim:

1. In a wire preparation machine for fabricating a continuous length of insulation clad wire into a plurality of cut and stripped wire leads including a preparation station, a cutting mechanism at the preparation station for cutting the wire, a stripping mechanism at the preparation station spaced a given distance from the cutting mechanism for stripping insulation from the wire lead exposing a given length of conductor from the end of the wire lead, and intermittent wire drive means for moving the wire to the preparation station after each cutting and stripping operation, the improvement comprising:
   stripper mounting means for mounting the stripping mechanism for movement relative to the cutting mechanism so as to vary the distance therebetween; and
   control means for programming the distance the stripper mounting means is allowed to move the cutting mechanism after each cutting and stripping operation, whereby said machine will produce a plurality of wire leads in a predetermined sequence different of exposed conductor lengths.

2. The machine of claim 1 wherein said control means is associated with said wire drive means for controlling the length of wire presented to the preparation station, whereby said machine will produce a pluarlity of wire leads in a predetermined sequence of wire lead lengths.

* * * * *